United States Patent
Metz et al.

(10) Patent No.: US 6,976,809 B1
(45) Date of Patent: Dec. 20, 2005

(54) METHOD OF PREVENTING FROST HEAVE STRESS CONCENTRATIONS IN CHILLED BURIED PIPELINES

(76) Inventors: Paul A. Metz, P.O. Box 73606, Fairbanks, AK (US) 99707; Barry Donnellan, P.O. Box 73795, Fairbanks, AK (US) 99707

( * ) Notice: Subject to any disclaimer, the term of this patent is extended or adjusted under 35 U.S.C. 154(b) by 65 days.

(21) Appl. No.: 10/940,856

(22) Filed: Sep. 14, 2004

(51) Int. Cl.[7] ............... F16L 1/00; F16L 59/00; E02D 19/14
(52) U.S. Cl. ............... 405/157; 405/130; 405/184.4; 138/32
(58) Field of Search ............... 405/157, 130, 405/179, 184.4; 138/32, 105, 149; 165/45; 62/260

(56) References Cited

U.S. PATENT DOCUMENTS

| | | | | |
|---|---|---|---|---|
| 3,952,529 | A * | 4/1976 | Lefever | 405/157 |
| 4,358,223 | A * | 11/1982 | Jahns et al. | 405/157 |
| 4,464,082 | A * | 8/1984 | Isaacs | 405/157 |
| 4,487,271 | A * | 12/1984 | Pomeroy et al. | 173/29 |
| 4,629,364 | A * | 12/1986 | Sayles et al. | 405/157 |
| 4,925,493 | A * | 5/1990 | Lamoreaux | 106/272 |
| 5,765,967 | A * | 6/1998 | Klaymar | 405/179 |
| 5,772,912 | A * | 6/1998 | Lockyer et al. | 252/70 |
| 5,922,240 | A * | 7/1999 | Johnson et al. | 252/70 |
| 6,558,081 | B2 * | 5/2003 | Hull | 405/157 |
| 2005/0042034 | A1 * | 2/2005 | Bose et al. | 405/129.57 |

FOREIGN PATENT DOCUMENTS

JP 03033596 * 2/1991 ............... 405/157

* cited by examiner

Primary Examiner—Jong-Suk (James) Lee
(74) Attorney, Agent, or Firm—Michael J. Tavella

(57) ABSTRACT

A method for maintaining a stable soil by surrounding a chilled gas pipe with a material that has an antifreeze component that prevents the soil from freezing. By keeping the soil from freezing, it remains stable at all times. The method calls for excavating a trench, lining it with a geotextile membrane that keeps water from infiltrating into the trench, and then surrounding it with a bed of limestone (calcium carbonate) that is mixed with calcium magnesium acetate (CMA), which acts as an anti-freeze agent. The limestone-CMA mixture surrounds the pipe. The trench is covered by another geotextile membrane to completely seal it. In this way, the pipeline is surrounded by a material that is not subject to freezing. As such, it provides a stable bed for the pipeline to prevent frost heaving.

11 Claims, 6 Drawing Sheets

METHOD OF PREVENTING FROST HEAVE STRESS CONCENTRATIONS IN CHILLED BURIED PIPELINES

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to the field of underground pipelines and more specifically to a pipeline installation in areas in which the pipeline extends through soil zones having frost heave driving forces.

2. Description of the Prior Art

The design of underground pipelines in regions of discontinuous and continuous permafrost must incorporate the same design parameters for construction in warm climates, such as internal pressure, temperature differentials and soil conditions. Additionally, in cold climates with permafrost conditions, the effects of pipeline differential settlement due to thawing, the complex effects of differential frost heave, and the effects of massive movements such as solifluction, soil creepy and cryoturbation must be included in the design. These parameters become even more acute when any pipeline is designed to transport natural gas at high pressures. High pressures mandate that the pipelines be buried. Generally, in arctic and sub-arctic environments, soils are highly variable in composition, texture, moisture content, and stability under thawed conditions. Thus, the soils are highly heterogeneous with respect to critical parameters that determine the strength and bearing capacity of the soil mass, which in turn constrains the design of the buried pipeline.

Because of these parameters, an optimal design would result in the construction of chilled gas pipelines (operated below zero degrees centigrade) in regions of continuous permafrost and warm pipelines (operated above zero degrees centigrade) in regions with unfrozen soil. However, in regions of discontinuous permafrost the operational design becomes more complex. If the pipeline is operated as a chilled facility in unfrozen and heterogeneous soil, differential frost heaves occur because of the asymmetrical frost bulb that develops with time around the pipe. An example of such an asymmetrical frost bulb is shown FIG. 1, which is derived from FIG. 8 of *Thermal effects in permafrost*, Gold, L. W., Johnston, G. H., Slusarchuk, W. A., and Goodrich, L. E., 1972, in Proceedings of Canadian Northern Pipeline Research Conference, Conference, Ottawa, 2–4 February, Division of Building Research, National Research Council of Canada. This figure shows that, over time, the ground around the chilled pipeline freezes both horizontally and vertically. Thus, for a pipeline operating at 20° F., after 5 years, the ground around the pipe will freeze to an extent of 20 feet on the horizontal and 25 feet on the vertical. For a pipeline operating at −166° F., the ground will freeze to an extent of 40 feet on the horizontal and almost 60 feet on the vertical after the same five years. The problem is that the development of the frost bulb results in frost heave. With differing soils of differing moisture content and thermal conductivity along the pipeline, differential frost heave develops. Differential frost heave is also produced by asymmetry of the frost bulb. Differential frost heave results in high stress concentrations around the pipe that can result in a catastrophic failure particularly in high pressure pipelines.

Two examples of the types of heaving forces are shown in FIGS. 2 and 3, which are derived from FIG. 7.2 of *Construction in cold regions*, McFadden, T. T., and Bennet, F. L., 1991: John Wiley and Sons, New York. FIG. 2 shows settlement or driving forces and FIG. 3 shows heaving or driving forces. In either case, the driving force is caused by forces acting on a pipe 100 that is in an area of higher settling soils 120 (FIG. 2) or higher heaving soil 130 (FIG. 3) lying between areas of lesser heaving or settling soils 110.

If the pipeline is operated as a warm facility in areas of frozen soil, the soil will thaw and differential settlement may occur. Extreme conditions occur at the interfaces between ice rich frozen soils and unfrozen soils.

These differential movements produce horizontal and vertical transverse stress, longitudinal stress, and torsional stress in the pipeline. Most of the attempts to solve these problems have addressed the vertical settlement and vertical frost heave induced stresses.

For example, one solution to differential vertical frost heave under a chilled pipeline includes placing insulation under the pipeline, adding electric heating under the insulation, and placing a system of sensors and controls to maintain equilibrium under the insulating pad. This solution has been proposed in *Chilled gas pipeline-frost heave design*, Svec, O. J., in T. S. Vinson (ed) The Northern Community: A search for a quality environment, American Society of Civil Engineers Specialty Conference, Seattle, Apr. 8–10, 1981, pp. 705–718. This proposed system is complex and requires both power and sensor systems to monitor each site of differing soil conditions (frost heave susceptibility). Moreover, the mathematical model used by Svec for the proposed design assume homogeneous soil conditions and only vertical migration of groundwater to the freezing front around the chilled pipeline. Such assumptions are overly simplistic because discontinuous permafrost soils are not homogeneous and significant lateral movement of groundwater is the norm. The frost bulb developing around a chilled pipeline will be larger on the side of the pipe up the hydraulic gradient than on the side down the gradient. The result is a significant torsional stress on the pipe. The design proposed by Svec also does not address the effects of mass movements on slopes at high angles on the buried pipeline.

Several other methods can be used to stabilize such soils. First, the soil can be excavated over a large enough area to remove the frost susceptible soils. This is an expensive and possibly environmentally problematic solution. Second, techniques can be employed that maintain the soils in a perpetually frozen state. Examples of this technique can be found in U.S. Pat. Nos. 3,650,119 and 4,464,082. U.S. Pat. No. 3,650,119 describes a system that keeps ground permanently frozen when transporting warm oil through a pipeline. Here, the ground is kept frozen by insulating the warm oil pipe and running an uninsulated chilled gas pipeline in the same trench. The chilled gas line keeps the surrounding ground from thawing, keeping both pipes in stable ground. Although it is effective, this method requires the installation of a second pipeline, which adds to the cost. Moreover, it can only be used where a ready supply of chilled gas is available.

U.S. Pat. No. 4,464,082 teaches a case for protecting a chilled gas line from frost heaves. In this case, the upper 300 degrees of pipe is covered with insulation. The bottom 60 degrees of pipe are left uncovered. In this way, the pipe helps keep the ground below it frozen while the active layer above is free to freeze and thaw. In this case, the inventors were concerned about uplift of the pipe caused by frost heaving under the pipe. By keeping the soil below the pipe chilled, they believed that the pipe would not experience such uplifts. However, research shows that this method does not work.

BRIEF DESCRIPTION OF THE INVENTION

The instant invention overcomes these problems. It maintains a stable soil by surrounding a pipe with a material that has an antifreeze component that prevents the soil from freezing. The pipe is then surrounded by a bed of classified aggregate, preferably crushed limestone, which has relatively low thermal conductivity and a low coefficient of thermal expansion. Solid calcium magnesium acetate (CMA) in the form of pellets, which acts as an anti-freeze agent, is mixed with the aggregate prior to emplacement in the trench. The method calls for excavating a trench as normal. The trench is then lined with a geotextile membrane that keeps water from infiltrating into the trench. The pipe is then surrounded by the bed of limestone and calcium magnesium acetate (CMA) mixture. The mixture is brought to the surface, where it is covered by another geotextile membrane to completely seal the trench. This cover can then be covered with a layer of soil to protect the membrane. In this way, the pipeline is surrounded by a material that is not subject to freezing. As such, it provides a stable bed for the pipeline to prevent frost heaving.

DETAILED DESCRIPTION OF THE INVENTION

Figure 1:
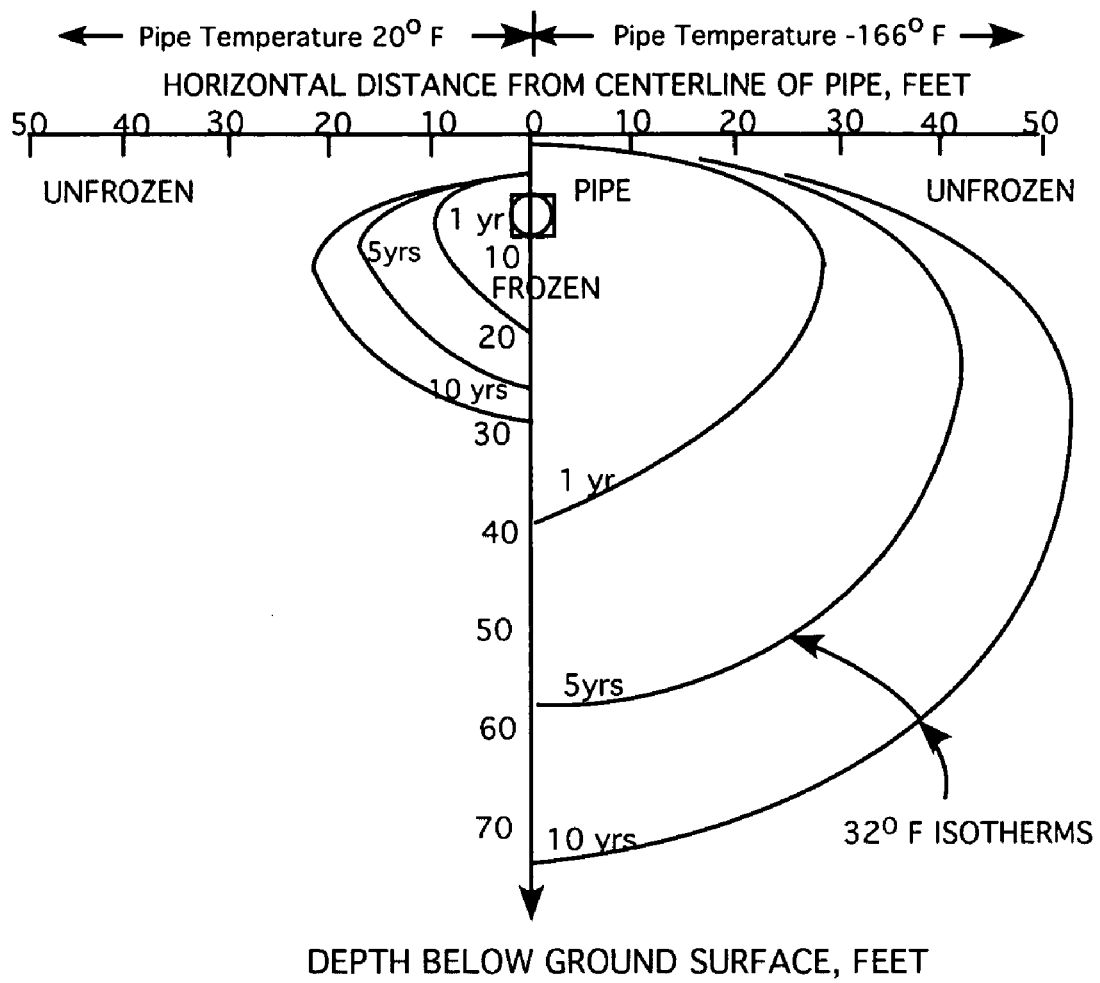
FIG. 1 is graph of the frost bubble that develops over time around a chilled gas pipe.
Figure 2:
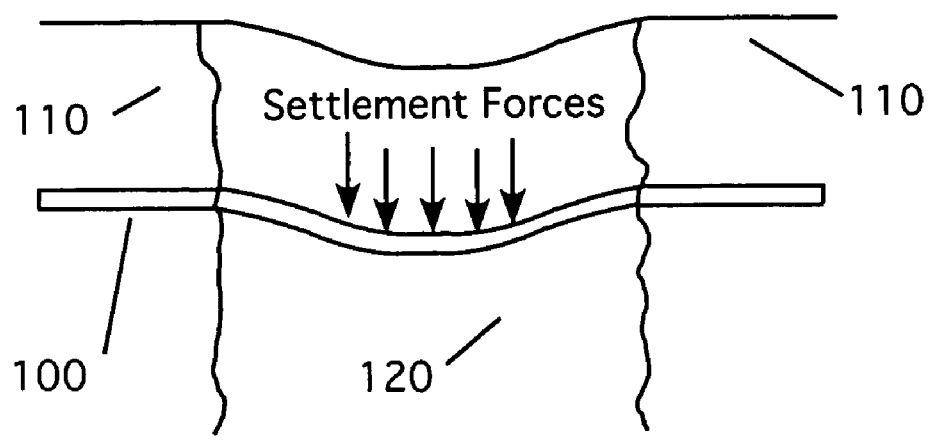
FIG. 2 is a schematic diagram of the effects of thaw settlement on a pipeline.
Figure 3:
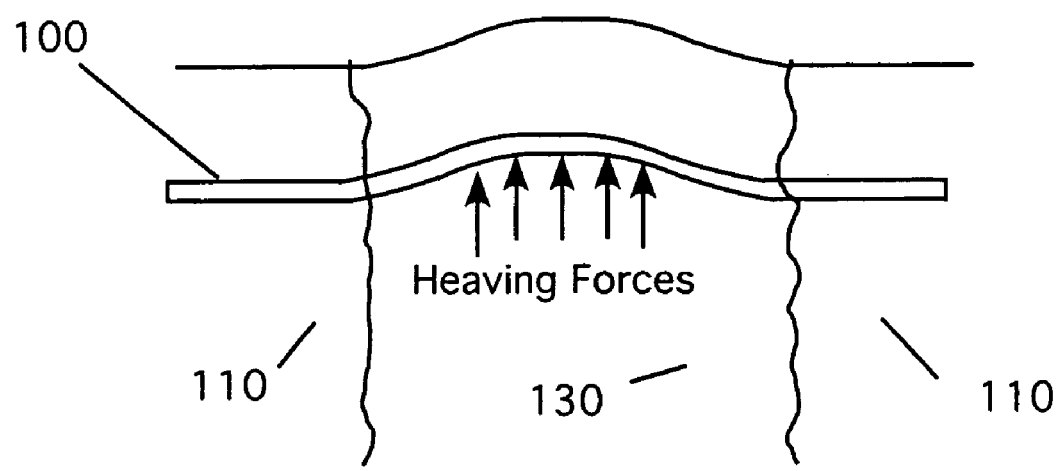
FIG. 3 is a schematic diagram of the effects of frost heave on a pipeline.
Figure 4:
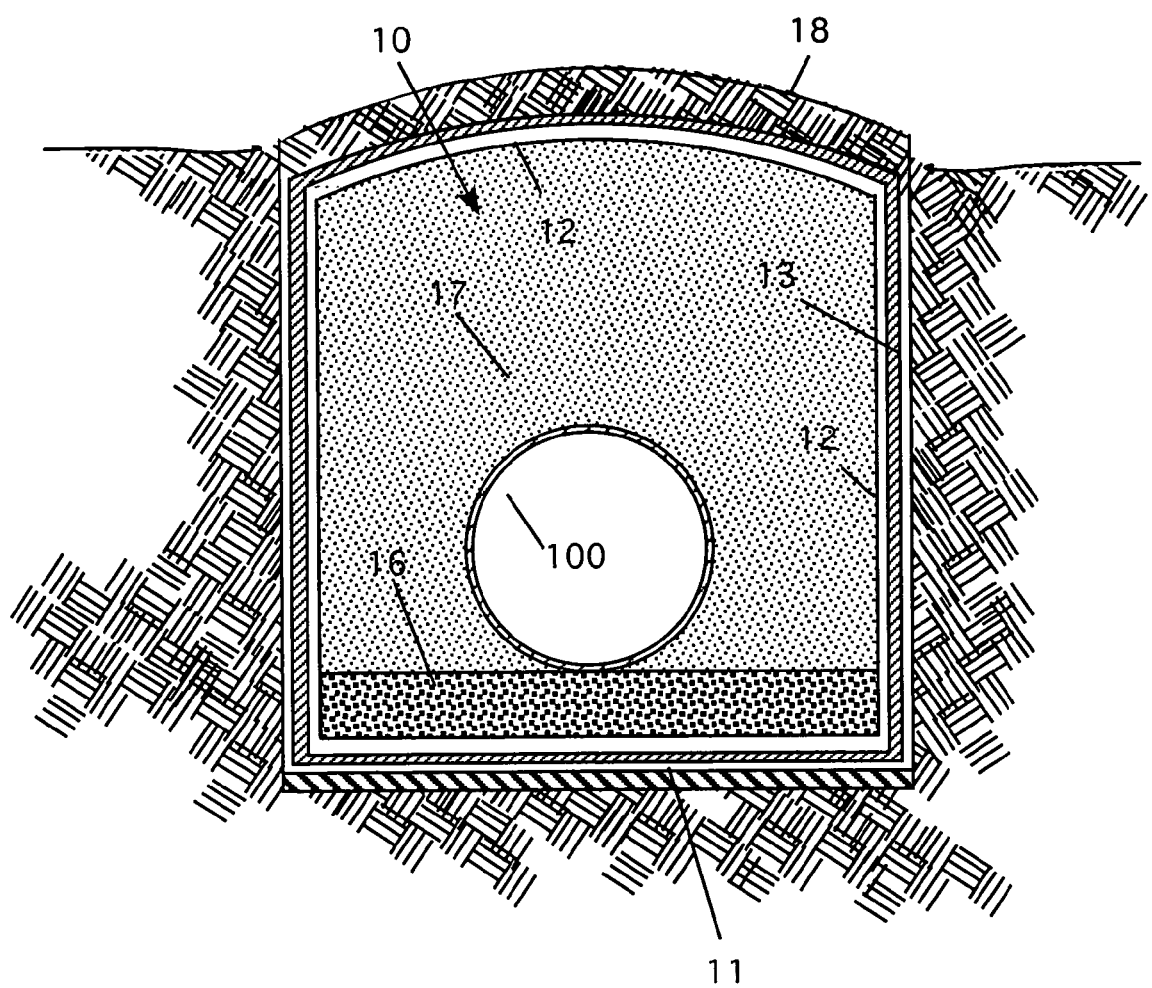
FIG. 4 is a cross-sectional view of a trench showing a pipeline installed using the method of the instant invention.
Figure 5:
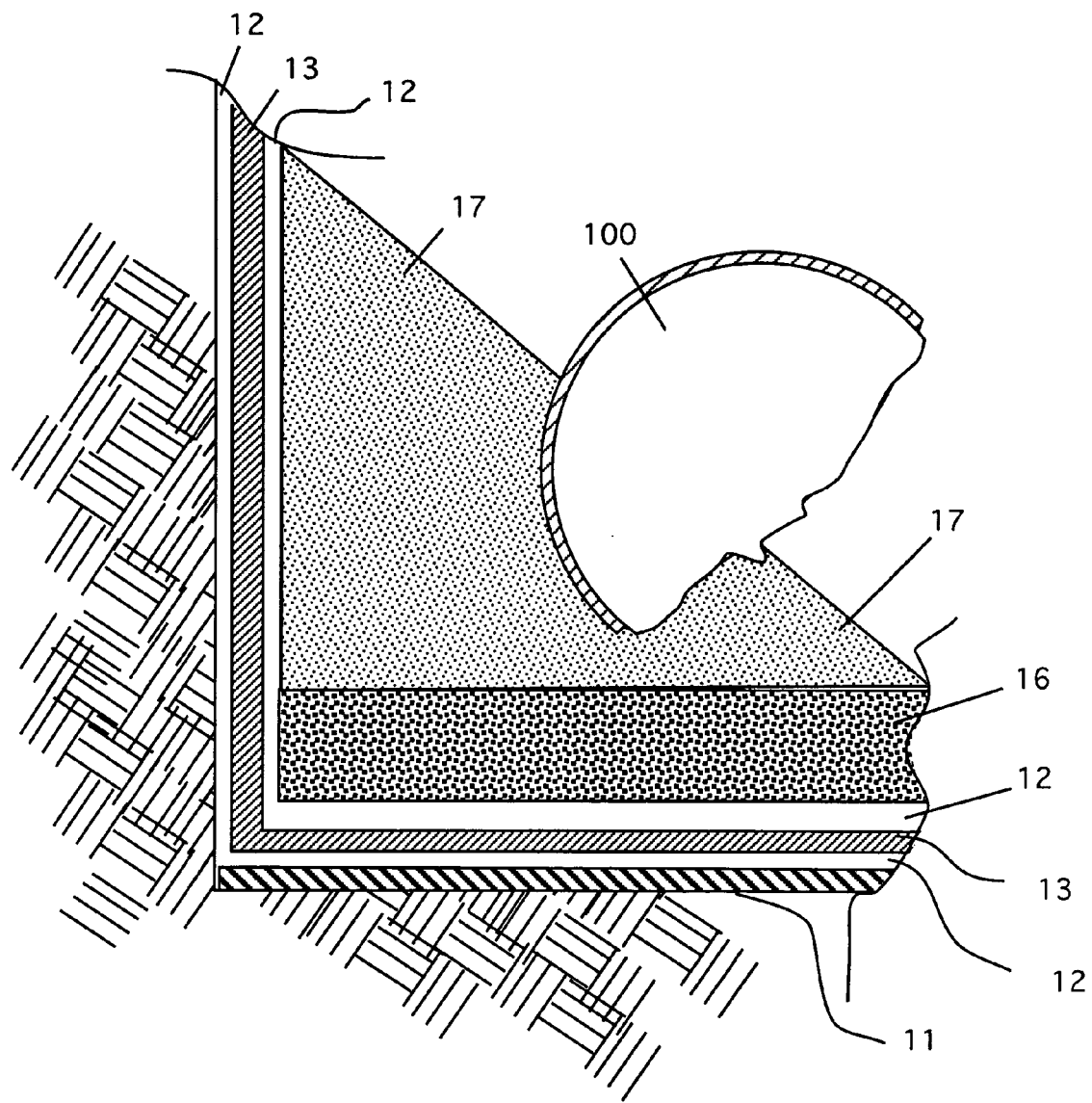
FIG. 5 is a detail view of the trench showing construction details.

Referring now to FIG. 4, the design solution is to provide an unfrozen volume of soil around the buried and chilled pipeline. A trench 10 is excavated as normal. An optional layer of insulation 11 may be placed at the bottom of the trench. Two layers of geotextile fabric 12 with an intervening impermeable membrane 13 are placed in the pipeline trench as shown (see also FIG. 5). A bedding layer of classified material 16 is place in the bottom of the trench and the pipe 100 is placed on the bedding material 16. Additional classified fill material along with calcium magnesium acetate (CMA) 17 is added to the trench. The concentration of CMA is sufficient to reduce the freezing point of any pore moisture in the classified fill to below the minimum temperature of the chilled pipeline. Determining the concentration of CMA is discussed below. The CMA can be added in two ways. In the preferred embodiment, the CMS is mixed into the limestone as pellets, based on the concentrations discussed below. The pellets are mixed into the aggregate using ordinary techniques known in the art. As an alternative, the CMA pellets can be dissolved into a liquid form, which is then injected into the aggregate in the proper concentration. The geotextiles and the impermeable membrane are then sealed over the classified material to prevent the infiltration of groundwater. Infiltration of groundwater may take place at low to very low rates and still not reduce the effectiveness of the design (see discussion with the following example). Unclassified fill 18 is then added to the top of the trench and the material is then prepared for revegetation.

This volume of classified, unfrozen, and flexible material distributes the vertical and horizon transverse stress due to frost heave over a large length of the pipeline and at the margins of the classified fill envelope, thus decreasing local stress concentrations on the pipe. Moreover, the design removes the torsional stresses from the pipeline and places those stresses on the larger surface area of the unfrozen envelope. The design also distributes lateral stress on the pipeline due to the massive movements on slopes such as solifluction, soil creep, and cryoturbation over a greater length of the pipe as well as at the margin of the unfrozen and flexible envelope.

The design provides for a passive system that requires no continuous material or energy inputs. Gradual infiltration of water in the sealed envelop may over time dilute the CMA concentration to a level that fails to depress the freezing point below the temperature of the chilled pipeline. In that event, saturated solutions of CMA can be injected into recharge pipes installed either during or after initial construction of the pipeline.

From an operations and maintenance perspective, the subject design provides an additional significant cost advantage over designs that do not provide for an unfrozen envelop around the pipe. In the event that the pipe needs to be excavated for any reason, the thawed envelope makes such excavation less equipment and labor intensive and of a much shorter duration. Time is generally of the essence in pipeline repair since shut downs adversely impact customers particularly during winter months.

Another benefit from this method is that pipe wall thickness can be reduced to accommodate only internal gas pressures. This is possible because current designs for chilled gas pipelines in permafrost regions specify wall thickness far in excess of that required by the internal gas pressure. This reflects an attempt to solve geotechnical problems by increasing the structural rigidity of the pipe. The instant invention solves the geotechnical problems without inducing additional stresses in the pipe. Thus, the pipe wall thickness can be reduced, which results in savings in the form of reduced pipe costs, reduced transportation costs, and reduced construction costs that more than compensate for the cost of the instant invention.

EXAMPLE

Figure 6:
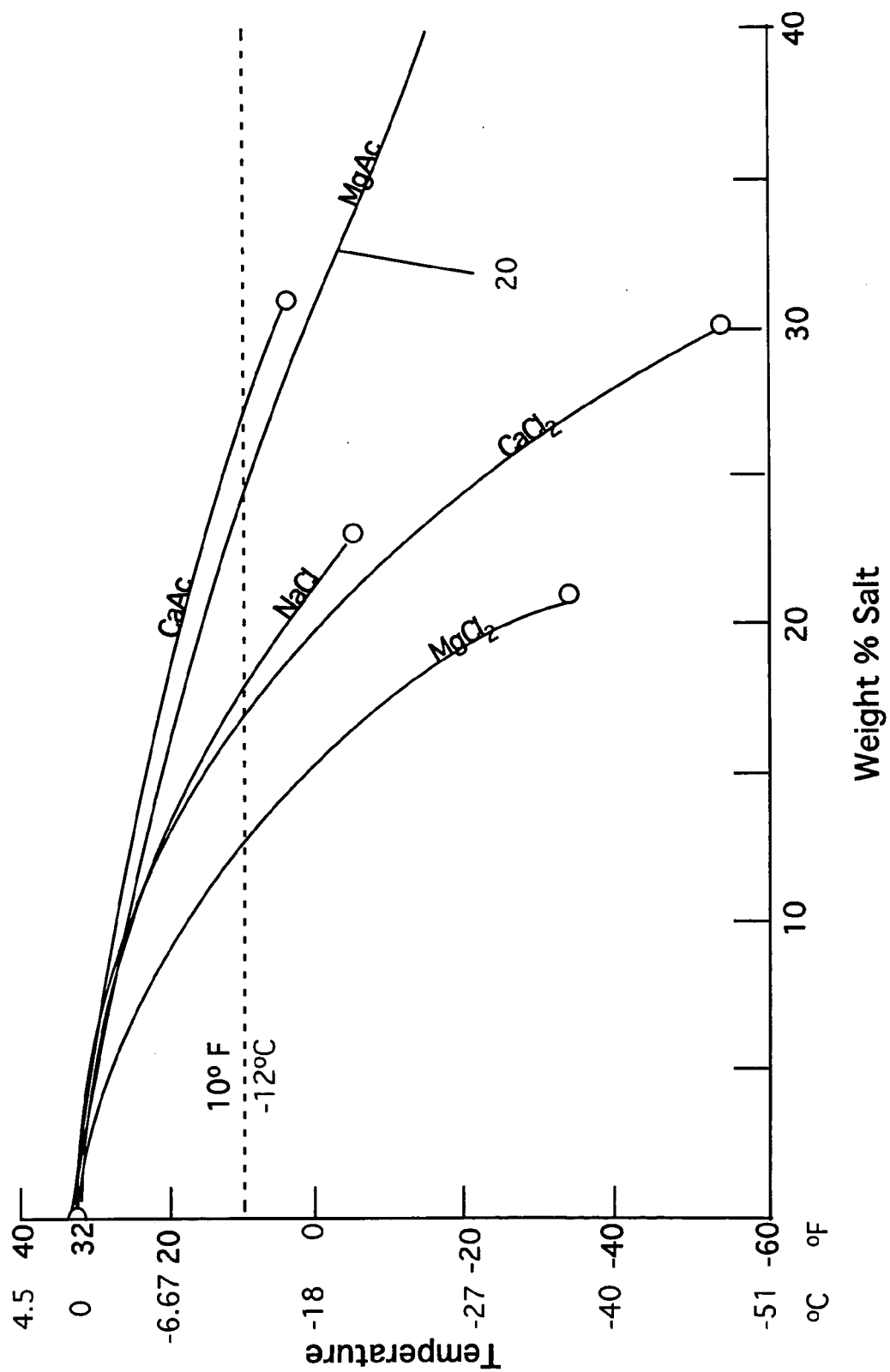
FIG. 6 is a graph of the phase relationships for various salts as a function of temperature vs. the weight percent of the salt.
Figure 7:
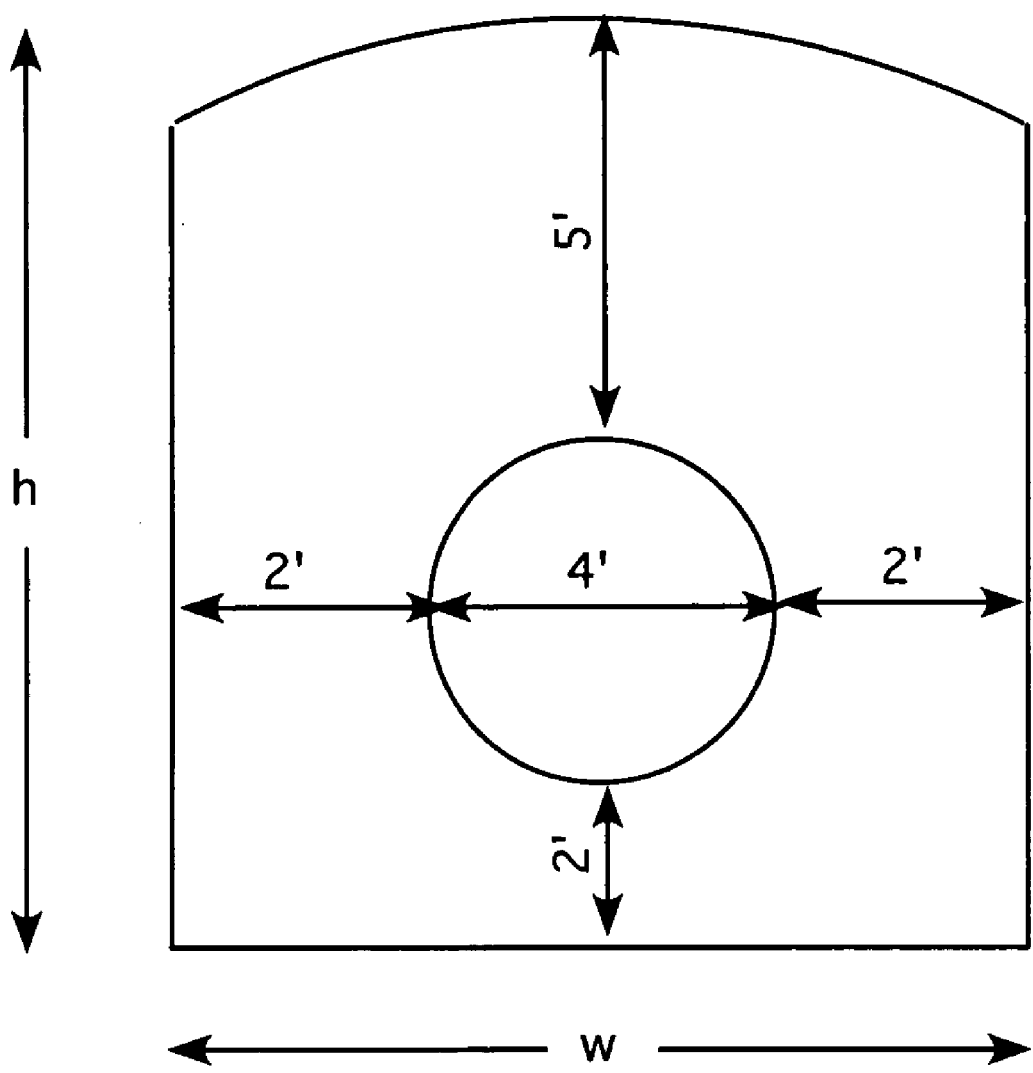
FIG. 7 is a schematic diagram to demonstrate the calculation of the quantities of CMA that would be needed for the assumed section of a buried natural gas pipeline that is chilled to a minimum temperature of minus 10 degrees centigrade.

FIG. 7 is a schematic diagram used to demonstrate the calculation of the quantities of CMA that are needed for an assumed section of a buried natural gas pipeline that is chilled to a minimum temperature of minus 12 degrees centigrade (10 degrees F). The dimensions shown in FIG. 7 are exemplary. As shown, the volume of classified fill within each linear foot of the flexible envelope (that is, contained within the geotextile fabric) is 88 cubic feet (2.5 cubic meters) (8 ft (2.44 m) (w)×11 ft (3.35 m) (h)×1 ft (0.305 m) (L)). The volume occupied by the pipe per linear foot is 12.6 cubic feet (0.357 cubic meters) (3.1416×2 ft (0.607 m)×2 ft (0.607 m)). Thus, the net volume per linear foot (lineal meter) is 75.4 cubic feet (2.14 cubic meters). For this example, it is assumed that the volume of voids is approximately 10 percent of the total volume or about 8 cubic feet (0.227 cubic meters). In order to reduce the freezing point of water at saturation to minus 12 degrees centigrade (10 degrees F), a 25 wt. percent solution of CMA is required (see attached FIG. 6, derived from *Pilot plant studies and process design for the production of calcium-magnesium acetate: University of Alaska Fairbanks Contract Final Report to the Alaska Department of Transportation and Public Facilities,* Ostermann, R. D., and Economides, M. J., 1985. In this figure, the MgAc line 20 is used. Note that this line crosses the 10° F. (−12° C.) line at 25 percent.

The amount of CMA is thus 125 lbs (57 kg) derived by calculating: (62.4 lbs/cf (1000 kg/cm)×8 cf (0.227 cm)×0.25) per linear foot of pipeline. At $400 per ton ($0.44/kg), the cost of CMA is $25 per linear foot (lineal meter) of pipeline.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A method of preventing frost heave stress concentrations in a chilled buried pipeline comprising the steps of:
   a) excavating a trench, said trench having a top and a bottom;
   b) lining said trench with a layer of a water-impermeable liner;
   c) placing a pipe in said trench;
   d) surrounding said pipe with a fill material, wherein said fill material includes a quantity of classified material mixed with a quantity of calcium magnesium acetate; and
   e) sealing said trench by placing a layer of a water-impermeable fabric on the top of said trench.

2. The method of claim 1 wherein the water-impermeable liner includes a layer of geotextile fabric.

3. The method of claim 1 wherein the water-impermeable liner includes a first layer of geotextile fabric, an impermeable membrane, and a second layer of geotextile fabric.

4. The method of claim 1 wherein the quantity of calcium magnesium acetate is sufficient to reduce the freezing point of any pore moisture in the classified fill to below the minimum temperature of the chilled pipeline.

5. The method of claim 1 further comprising the step of installing a layer of insulation in the bottom of the trench before lining the trench with the layer of a water-impermeable liner.

6. The method of claim 1 further comprising the step of adding a layer of unclassified fill layer on top of the water-impermeable fabric on the top of said trench.

7. The method of claim 1 further comprising the step of placing a layer of bedding material under the pipe, before laying the pipe in the trench.

8. A method of preventing frost heave stress concentrations in chilled buried pipelines having a minimum temperature, comprising the steps of:
   a) excavating a trench, said trench having a top and a bottom;
   b) lining said trench with a first layer of a geotextile fabric;
   c) placing an impermeable membrane over said first layer of a geotextile fabric;
   d) placing a second layer of a geotextile fabric over said impermeable membrane;
   e) placing a quantity of a fill material in the bottom of said trench, wherein said fill material includes a quantity of classified material mixed with a quantity of calcium magnesium acetate;
   f) placing a pipe in said trench, on top of said quantity of a fill material;
   g) placing an additional quantity of fill material, wherein said additional quantity of fill material includes a quantity of classified material mixed with a quantity of calcium magnesium acetate, such that said pipe is completely covered by said additional quantity of fill material; and
   h) sealing said trench by placing a layer of a water-impermeable fabric on the top of said trench.

9. The method of claim 8 wherein the quantity of calcium magnesium acetate is sufficient to reduce the freezing point of any pore moisture in the classified fill to below the minimum temperature of the chilled pipeline.

10. The method of claim 8 further comprising the step of installing a layer of insulation in the bottom of the trench before lining the trench with the layer of a water-impermeable liner.

11. The method of claim 8 further comprising the step of adding a layer of unclassified fill layer on top of the water-impermeable fabric on the top of said trench.

* * * * *